(12) United States Patent
Won

(10) Patent No.: US 11,724,640 B2
(45) Date of Patent: Aug. 15, 2023

(54) DYNAMIC BENDING ADB HEAD LAMP SYSTEM AND METHOD FOR CONTROLLING THE SAME

(71) Applicant: HYUNDAI MOBIS CO., LTD., Seoul (KR)

(72) Inventor: Yong Hee Won, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 204 days.

(21) Appl. No.: 17/133,308

(22) Filed: Dec. 23, 2020

(65) Prior Publication Data
US 2021/0206313 A1    Jul. 8, 2021

(30) Foreign Application Priority Data

Jan. 6, 2020  (KR) .......................... 10-2020-0001555

(51) Int. Cl.
  *B60Q 1/14*  (2006.01)
  *F21S 41/657*  (2018.01)
  *F21S 41/151*  (2018.01)
(52) U.S. Cl.
  CPC ............ *B60Q 1/143* (2013.01); *F21S 41/151* (2018.01); *F21S 41/657* (2018.01); *B60Q 2300/122* (2013.01)
(58) Field of Classification Search
  CPC .. B60Q 1/143; B60Q 2300/12; B60Q 1/0023; B60Q 1/0041; F21S 41/657; F21S 41/151; H05B 47/125
  See application file for complete search history.

(56) References Cited

U.S. PATENT DOCUMENTS

| | | | |
|---|---|---|---|
| 2011/0025209 A1* | 2/2011 | Nakanishi | B60Q 1/12 315/82 |
| 2013/0169154 A1* | 7/2013 | Kay | F21S 41/151 315/81 |
| 2014/0175978 A1* | 6/2014 | Kobayashi | B60Q 1/1423 362/487 |
| 2019/0092222 A1* | 3/2019 | Waragaya | B60Q 11/00 |
| 2020/0326049 A1* | 10/2020 | Sawada | F21S 41/663 |
| 2021/0016705 A1* | 1/2021 | Hartisch | G06V 20/582 |

FOREIGN PATENT DOCUMENTS

| | | |
|---|---|---|
| KR | 10-2016-0020000 A | 2/2016 |
| KR | 10-1896814 B1 | 10/2018 |

* cited by examiner

*Primary Examiner* — Wei (Victor) Y Chan
(74) *Attorney, Agent, or Firm* — DLA Piper LLP (US)

(57) ABSTRACT

The present disclosure relates to a dynamic bending ADB head lamp system and a method for controlling the same that, in an ADB or a high beam operation of a vehicle equipped with a head lamp of a matrix type having an ADB function, may move a central region of a high beam in a direction of a movement of the vehicle in response to a change in a steering angle of the vehicle to improve visibility of a driver, and move the central region of the high beam by changing only a current value without a separate driving motor to reduce a manufacturing cost.

5 Claims, 5 Drawing Sheets

DYNAMIC BENDING ADB HEAD LAMP SYSTEM AND METHOD FOR CONTROLLING THE SAME

CROSS-REFERENCE TO RELATED APPLICATION

This application claims the benefit of priority to Korean Patent Application No. 10-2020-0001555, filed in the Korean Intellectual Property Office on Jan. 6, 2020, the entire contents of which are incorporated herein by reference.

TECHNICAL FIELD

The present disclosure relates to a dynamic bending ADB head lamp system and a method for controlling the same, and more specifically, to a dynamic bending ADB head lamp system and a method for controlling the same that, in an ADB or a high beam operation of a vehicle equipped with a head lamp of a matrix type having an ADB function, move a central region of a high beam in response to a change in a steering angle of the vehicle.

BACKGROUND

In general, a vehicle is equipped with lighting fixtures for the purpose of recognizing a road or an object in a travel direction when traveling at night and informing other vehicles or other road users of a travel state of the vehicle.

Among those, a head lamp, which is a lighting lamp that illuminates a path ahead of the vehicle, requires brightness to identify a road and an obstacle on the road at a distance of about 100 m ahead at night. Such head lamp mainly maintains a low beam pattern in normal times to prevent glare to a driver of an opposite vehicle traveling in an opposite direction or to a driver of a preceding vehicle, and forms a high beam pattern as needed when traveling at high speed or when traveling in a dark place to ensure safe driving.

However, there is a case of forming the high beam pattern and traveling without recognizing the opposite vehicle or the preceding vehicle. In this case, there was a concern of a safety accident as the glare is caused to the driver of the opposite vehicle or the driver of the preceding vehicle.

Thus, recently, provided is an adaptive driving beam (ADB) head lamp, that is, an adaptive head lamp that automatically adjusts an angle, a brightness, a width, and a length of light illumination of the head lamp to not cause the glare to the driver of the opposite vehicle or the preceding vehicle driver when the opposite vehicle or the preceding vehicle is sensed while traveling in the state in which the high beam pattern formed.

The adaptive head lamp is classified into a dynamic type that changes a head lamp angle by a swivel actuator when the opposite vehicle or the preceding vehicle is sensed to form a dark zone in a space where the opposite vehicle or the preceding vehicle is located, and a matrix type that selectively turns on or turns off a plurality of light sources to form the dark zone in the space where the opposite vehicle or the preceding vehicle is located.

In an ADB or a high beam operation of the head lamp having a conventional ADB function, a phenomenon in which a beam pattern is maintained the same unlike the low beam even when a steering angle is changed and thus a side region of a curved road is felt dark occurred.

In particular, a basic beam pattern of the high beam forms a pattern using a high current in a central region and forms a beam pattern by decreasing a current value outward, so that a phenomenon in which a periphery is felt to be darker compared to the central region has occurred.

SUMMARY

The present disclosure has been made to solve the above-mentioned problems occurring in the prior art while advantages achieved by the prior art are maintained intact.

An aspect of the present disclosure provides a dynamic bending ADB head lamp system and a method for controlling the same that, in an ADB or a high beam operation of a vehicle equipped with a head lamp of a matrix type having an ADB function, may move a central region of a high beam in a direction of a movement of the vehicle in response to a change in a steering angle of the vehicle to improve visibility of a driver, and move the central region of the high beam by changing only a current value without a separate driving motor to reduce a manufacturing cost.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a dynamic bending ADB head lamp system includes a steering angle sensor that senses a steering angle of a steering wheel, an LED array that arranges a plurality of LEDs in a matrix form to form a beam pattern, wherein the LED array is formed by matching each angle information to each of a center LED, peripheral LEDs on one side of the center LED, and peripheral LEDs on the other side of the center LED, and an LED driver that individually controls the plurality of LEDs constituting the LED array, wherein the LED driver supplies a current corresponding to 50 to 90% of an allowable current to the center LED, and supplies currents corresponding to preset percentages equal to or less than the current supplied to the center LED to the peripheral LEDs on one side of the center LED and the peripheral LEDs on the other side of the center LED.

In one implementation, the dynamic bending ADB head lamp system may further include a vehicle controller that controls the LED driver to supply currents at the preset percentages to the plurality of LEDs constituting the LED array, wherein the vehicle controller controls the LED driver to supply the current corresponding to 50 to 90% of the allowable current to a center LED whose position is changed in response to a change in the steering angle when the change in the steering angle is sensed through the steering angle sensor, and supply the currents corresponding to the preset percentages equal to or less than the current supplied to the center LED to peripheral LEDs on one side of the center LED whose position is changed and peripheral LEDs on the other side of the center LED whose position is changed.

In one implementation, the one side may include one of a left side and a right side in a horizontal direction based on the center LED, and the other side may include the other of the left side and the right side in the horizontal direction.

In one implementation, the LED array may match 0 degrees to a center angle of the center LED, wherein the center angle of the center LED is a center of orientation angles of the center LED before a position change, and match angles of absolute values increasing in directions from the center LED to outermost LEDs to center angles of the peripheral LEDs on the one side of the center LED before the position change and the peripheral LEDs on the other side of the center LED before the position change, respectively.

In one implementation, the vehicle controller may determine the center LED whose position is changed based on the change in the steering angle and center angles of the plurality of LEDs.

In one implementation, the vehicle controller may maintain the position of the center LED before the position change until the change in the steering angle reaches a center angle of a peripheral LED on the one side of the center LED before the position change or a peripheral LED on the other side of the center LED before the position change.

In one implementation, orientation angles of the respective plurality of LEDs and center angles of the respective orientation angles may include fixed values that do not change.

In one implementation, orientation angles of the respective plurality of LEDs and center angles of the respective orientation angles may include preset fixed values based on a case where a change in the steering angle is 0.

In one implementation, the LED driver may supply the current corresponding to 50 to 90% of the allowable current to the center LED, and supply the currents corresponding to the preset percentages to the peripheral LEDs on the one side of the center LED and the peripheral LEDs on the other side of the center LED such that the currents sequentially decrease in directions from innermost LEDs to outermost LEDs in a range equal to or below the current supplied to the center LED.

According to another aspect of the present disclosure, a method for controlling a dynamic bending ADB head lamp includes a setting operation of matching, by an LED array that arranges a plurality of LEDs in a matrix form to form a beam pattern, each angle information to each of a center LED, peripheral LEDs on one side of the center LED, and peripheral LEDs on the other side of the center LED and storing the matched angle information, a sensing operation of sensing, by a steering angle sensor, a change in a steering angle of a steering wheel, and a supplying operation of controlling, by a vehicle controller that controls an LED driver to supply currents to the plurality of LEDs at preset percentages, the LED driver to supply a current corresponding to 50 to 90% of an allowable current to a center LED whose position is changed in response to the change in the steering angle, and supply currents corresponding to preset percentages equal to or less than the current supplied to the center LED to peripheral LEDs on one side of the center LED whose position is changed and peripheral LEDs on the other side of the center LED whose position is changed.

In one implementation, the setting operation may include matching 0 degrees to a center angle of the center LED, wherein the center angle of the center LED is a center of orientation angles of the center LED before a position change and storing the matched 0 degrees, and matching angles of absolute values increasing in directions from the center LED to outermost LEDs to center angles of the peripheral LEDs on the one side of the center LED before the position change and the peripheral LEDs on the other side of the center LED before the position change, respectively and storing the matched angles.

In one implementation, the supplying operation may include determining the center LED whose position is changed based on the change in the steering angle and center angles of the plurality of LEDs.

In one implementation, the supplying operation may include maintaining the position of the center LED before the position change until the change in the steering angle reaches a center angle of a peripheral LED on the one side of the center LED before the position change or a peripheral LED on the other side of the center LED before the position change.

In one implementation, the method may further include, after the setting operation and before the sensing operation, supplying the current corresponding to 50 to 90% of the allowable current to the center LED, and supplying the currents corresponding to the preset percentages to the peripheral LEDs on the one side of the center LED and the peripheral LEDs on the other side of the center LED such that the currents sequentially decrease in directions from innermost LEDs to outermost LEDs in a range equal to or below the current supplied to the center LED.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
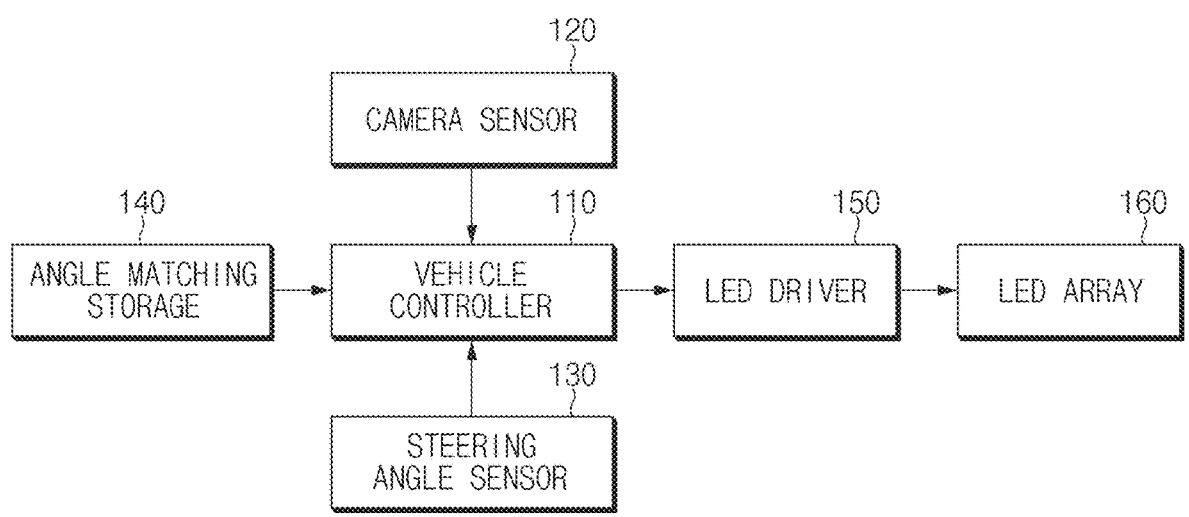
FIG. 1 is a block diagram illustrating a dynamic bending ADB head lamp system according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 4.

Figure 2:
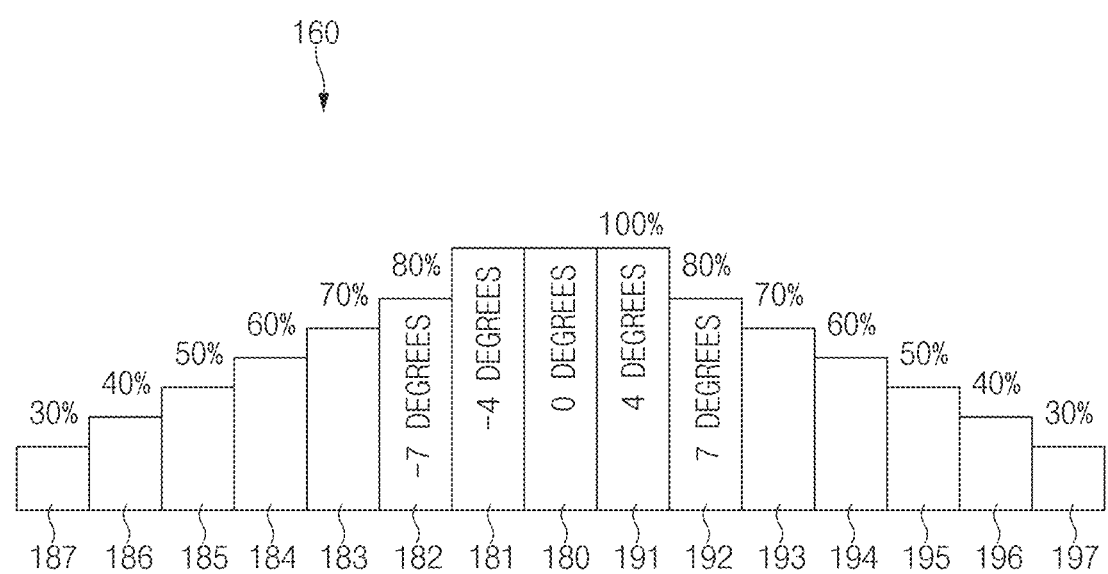
FIG. 2 is a view illustrating a state of a head lamp when a vehicle equipped with a dynamic bending ADB head lamp system according to an embodiment of the present disclosure travels straight.
Figure 3:
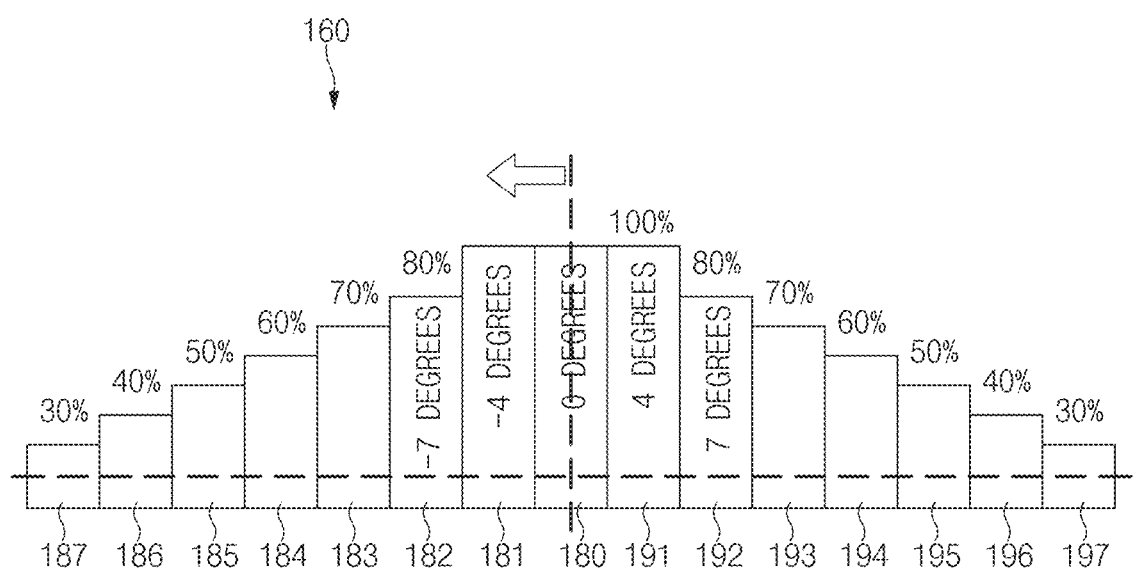
FIGS. 3 and 4 are views for illustrating a state of a head lamp when a vehicle equipped with a dynamic bending ADB head lamp system according to an embodiment of the present disclosure turns during travel.
Figure 4:
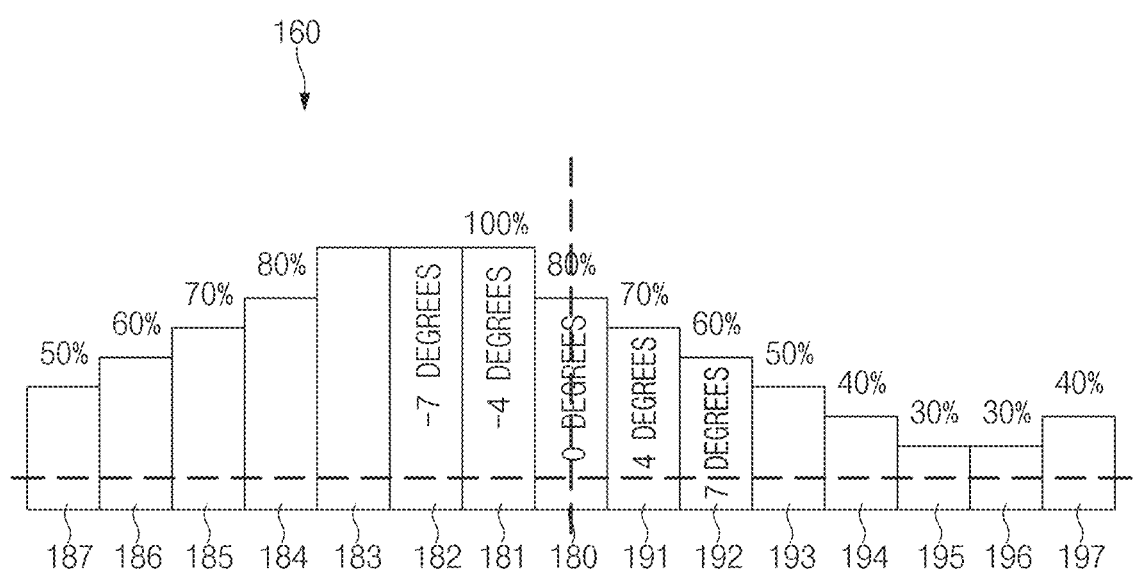

FIG. 1 is a block diagram illustrating a dynamic bending ADB head lamp system according to an embodiment of the present disclosure, FIG. 2 is a view illustrating a state of a head lamp when a vehicle equipped with a dynamic bending ADB head lamp system according to an embodiment of the present disclosure travels straight, and FIGS. 3 and 4 are views for illustrating a state of a head lamp when a vehicle equipped with a dynamic bending ADB head lamp system according to an embodiment of the present disclosure turns during travel.

Referring to FIG. 1, a dynamic bending ADB head lamp system according to an embodiment of the present disclosure may have an adaptive driving beam (ADB) function, which may include a vehicle controller 110, a camera sensor 120, a steering angle sensor 130, angle matching storage 140, an LED driver 150, and an LED array 160.

The camera sensor 120 captures image information of a region in front of the vehicle and transmits the image information to the vehicle controller 110. The transmitted image information may be read by the vehicle controller 110, and the vehicle controller 110 may determine presence or absence of a preceding vehicle or an opposite vehicle in front of the vehicle to perform the ADB function based on the read image.

The steering angle sensor 130 may sense a change in a steering angle of a steering wheel when the steering wheel is rotated for the vehicle to turn left or right.

The LED array 160 is used as a head lamp of the vehicle by arranging a plurality of LEDs in a matrix form, which may irradiate a beam as each LED is individually lit in response to a control signal by the LED driver 150.

Referring to FIG. 2, the LED array 160 may be configured by matching each angle information to each of a central LED 180, peripheral LEDs 181 to 187 on a left side in a horizontal direction and peripheral LEDs 191 to 197 on a right side in the horizontal direction based on the central LED 180.

For example, 0 degrees may be matched to the central LED 180, −4 degrees may be matched to the first left LED 181 on the left side of the central LED 180, and −7 degrees may be matched to the second left LED 182. Each angle information may be matched to each of the third left LED 183 to the seventh left LED 187 in such manner.

4 degrees may be matched to the first right LED 191 on the right side of the central LED 180, and 7 degrees may be matched to the second right LED 192. Each angle information may be matched to each of the third right LED 193 to the seventh right LED 197 in such manner.

That is, 0 degrees may be matched to a center angle of the central LED 180, which is a center of orientation angles at which a central LED before a position change is oriented, and angles of absolute values increasing in directions from the central LED to outermost LEDs may be respectively matched to center angles of the peripheral LEDs on one side of the central LED 180 before the position change and the peripheral LEDs on the other side of the central LED 180 before the position change.

The information obtained by respectively matching the angles to the central LED 180, the peripheral LEDs 181 to 187 on the left side in the horizontal direction and the peripheral LEDs 191 to 197 on the right side in the horizontal direction may be stored in the angle matching storage 140.

When the change in the steering angle of the steering wheel occurs while the steering wheel is rotated for the vehicle to turn left or right, the vehicle controller 110 may select an LED matched to a changed steering angle as the center LED based on the center angles of the plurality of LEDs included in the LED array 160.

For example, referring to FIG. 2, because there is no change in the steering angle of the steering wheel in a state in which the vehicle travels straight ahead and the steering wheel is in a correct position, the central LED 180 may be selected as the center LED.

However, when the steering wheel is rotated in a left direction for the vehicle to turn left and 4 degrees (−4 degrees) of the change in the steering angle of the steering wheel occurs in the left direction, the first left LED 181 matched thereto may be selected as (changed in the position to) the center LED. When the steering wheel is further rotated in the left direction and 7 degrees (−7 degrees) of the change in the steering angle of the steering wheel occurs in the left direction, the second left LED 182 matched thereto may be selected as (changed in the position to) the center LED.

Likewise, when the steering wheel is rotated in a right direction for the vehicle to turn right and 4 degrees (+4 degrees) of the change in the steering angle of the steering wheel occurs in the right direction, the first right LED 191 matched thereto may be selected as (changed in the position to) the center LED. When the steering wheel is further rotated in the right direction and 7 degrees (+7 degrees) of the change in the steering angle of the steering wheel occurs in the right direction, the second right LED 192 matched thereto may be selected as (changed in the position to) the center LED.

In addition, even when the position of the center LED is changed by the change in the steering angle of the steering wheel, the angle information respectively matched to the central LED 180, the peripheral LEDs 181 to 187 on the left side in the horizontal direction, and the peripheral LEDs 191 to 197 on the right side in the horizontal direction do not change as fixed values.

In one example, in the present disclosure, the number of LEDs arranged in the horizontal direction in the LED array 160 has been described as 15, but the present disclosure is not limited thereto. The number of LEDs in the horizontal direction may be reduced or increased depending on a shape of the vehicle.

The LED driver 150 individually controls the plurality of LEDs constituting the LED array 160 under control of the vehicle controller 110 to individually turn on the plurality of LEDs to irradiate the beam. A current corresponding to 50% or more of an allowable current may be supplied to the central LED 180, and currents corresponding to preset percentages equal to or less than the allowable current may be respectively supplied to the peripheral LEDs 181 to 187 on the left side in the horizontal direction and the peripheral LEDs 191 to 197 on the right side in the horizontal direction of the central LED 180.

For example, referring to FIG. 2, the control may be performed such that the current corresponding to 50% or more of the allowable current may be supplied to the central LED 180, the first left LED 181, and the first right LED 191, 80% of the current supplied to the central LED 180, the first left LED 181, and the first right LED 191 may be supplied to the second left LED 182 and the second right LED 192, 70% of the current supplied to the central LED 180, the first left LED 181, and the first right LED 191 may be supplied to the third left LED 183 and the third right LED 193, 60% of the current supplied to the central LED 180, the first left LED 181, and the first right LED 191 may be supplied to the fourth left LED 184 and the fourth right LED 194, 50% of the current supplied to the central LED 180, the first left LED 181, and the first right LED 191 may be supplied to the fifth left LED 185 and the fifth right LED 195, 40% of the current supplied to the central LED 180, the first left LED 181, and the first right LED 191 may be supplied to the sixth left LED 186 and the sixth right LED 196, and 30% of the current supplied to the central LED 180, the first left LED 181, and the first right LED 191 may be supplied to the seventh left LED 187 and the seventh right LED 197.

That is, the control may be performed such that the central LED 180 may receive the current corresponding to 50% or more of the allowable current, and the peripheral LEDs 181 to 187 on the left side in the horizontal direction and the peripheral LEDs 191 to 197 on the right side in the horizontal direction of the central LED 180 may respectively receive currents, which are sequentially reduced at preset percentages, equal to or below the allowable current.

Therefore, the beam may be irradiated forward in a brightest state from positions of the central LED 180, the first left LED 181, and the first right LED 191, and a brightness of the beam may decrease in directions from innermost LEDs to outermost LEDs of the peripheral LEDs 181 to 187 on the left side in the horizontal direction and the peripheral LEDs 191 to 197 on the right side in the horizontal direction of the central LED 180.

In addition, when the change in the steering angle of the steering wheel occurs when the steering wheel is rotated for the vehicle to turn left or right, an LED in the LED array 160 corresponding to the change in the steering angle may be selected as the center LED.

For example, because there is no change in the steering angle of the steering wheel in the state in which the vehicle travels straight ahead and the steering wheel is in the correct position, the central LED 180 may be selected as the center LED and be supplied with the current at the preset percentage as described above.

However, referring to FIGS. 3 and 4, when the steering wheel is rotated in the left direction for the vehicle to turn left and 4 degrees (−4 degrees) of the change in the steering angle of the steering wheel occurs in the left direction, the first left LED 181 matched thereto is selected as the center LED and a current supply pattern is changed. The first left LED 181, the second left LED 182, and the central LED 180 may receive the current corresponding to 50% or more of the allowable current and irradiate the beam in the brightest state forward.

When the steering wheel is further rotated in the left direction and 7 degrees (−7 degrees) of the change in the steering angle of the steering wheel occurs in the left direction, the second left LED 182 matched thereto is selected as the center LED and the current supply pattern is changed. The second left LED 182, the third left LED 183, and the first left LED 181 may receive the current corresponding to 50% or more of the allowable current and irradiate the beam in the brightest state forward.

That is, when the change in the steering angle of the steering wheel occurs by rotating the steering wheel in the left or the right direction, a shape of a beam pattern irradiated from the LED array 160 is integrally moved to one side or the other side in a form of a circulation ring based on the center LED. Referring to FIG. 4, as the steering wheel is rotated in the left direction to generate the change in the steering angle of the steering wheel of 7 degrees (−7 degrees) in the left direction and the second left LED 182 becomes the center LED, the current corresponding to 50% or more of the allowable current may be supplied to the second left LED 182, the third left LED 183, and the first left LED 181, 80% of the current supplied to the second left LED 182, the third left LED 183, and the first left LED 181 may be supplied to the fourth left LED 184 and the central LED 180, 70% of the current supplied to the second left LED 182, the third left LED 183, and the first left LED 181 may be supplied to the fifth left LED 185 and the first right LED 191, 60% of the current supplied to the second left LED 182, the third left LED 183, and the first left LED 181 may be supplied to the sixth left LED 186 and the second right LED 192, and 50% of the current supplied to the second left LED 182, the third left LED 183, and the first left LED 181 may be supplied to the seventh left LED 187 and the third right LED 193.

Subsequently, the current percentages of 40% and 30% of the current supplied to the second left LED 182, the third left LED 183, and the first left LED 181 to be supplied to the peripheral LEDs on the left side in the horizontal direction may be circulated to the right as the position of the center LED is moved to the left, and be allocated and supplied to the peripheral LEDs on the right side in the horizontal direction.

Thus, the control may be performed such that 30% of the current supplied to the second left LED 182, the third left LED 183, and the first left LED 181 is supplied to the sixth right LED 196 that has been circulated from the left, and 40% of the current supplied to the second left LED 182, the third left LED 183, and the first left LED 181 is supplied to the seventh right LED 197 that has been circulated from the left.

In addition, after changing the position of the center LED by the change in the steering angle, the position of the center LED may be maintained without being changed until a range of the change in the steering angle sensed through the steering angle sensor reaches the center angle matched to the peripheral LED.

That is, until the change in the steering angle reaches the center angle of the peripheral LED on one side of the center LED before the position change or the peripheral LED on the other side of the center LED before the position change, the position of the center LED before the position change may be maintained without being changed.

For example, in the state in which the steering wheel of the vehicle is rotated to obtain the change in the steering angle of −4 degrees and the first left LED 181 is accordingly selected as the center LED, even when the steering angle becomes −5 degrees or −6 degrees because of a minute movement of the vehicle steering wheel, the state in which the first left LED 181 is selected as the center LED is maintained without change.

Subsequently, the second left LED 182 is changed as the center LED only when the steering wheel is further rotated and the steering angle reaches −7 degrees. In this manner, a situation in which the current supply pattern supplied to the LEDs because of the minute steering angle change may be changed at any time may be prevented.

The LED driver 150 may provide the ADB function by individually controlling the plurality of LEDs constituting the LED array 160. Therefore, when the vehicle senses the opposite vehicle or the preceding vehicle through the camera sensor 120 while driving in a high beam state, as the plurality of LEDs are selectively turned on or off, even when separate driving means such as a driving motor or the like is not provided, a dark zone is formed in a space where the opposite vehicle or the preceding vehicle is located, thereby preventing induction of glare to a driver of the opposite vehicle or the preceding vehicle.

That is, a technology according to the present disclosure operates like an ADB head lamp during the travel to prevent the induction of the glare to the driver of the opposite vehicle or the preceding vehicle. A central region of the vehicle head lamp moves in response to the change in the steering angle, so that, not only in a low beam state, but also in the high beam state, the central region of the beam pattern moves to the left when the vehicle turns left and the central region of the beam pattern moves to the right when the vehicle turns right, thereby improving visibility of the driver. In addition, the central region of the head lamp may be moved when the vehicle turns left or right by changing only the supply current value without the separate driving means such as the driving motor or the like, and the ADB function may be performed, thereby reducing manufacturing cost.

The vehicle controller 110 controls the LED driver 150 to supply the currents to the plurality of LEDs constituting the LED array 160 at the preset percentages. When the change in the steering angle is sensed through the steering angle sensor 130, the vehicle controller 110 may perform the control such that the current corresponding to 50% or more of the allowable current is supplied to the center LED that has been changed in the position by being matched to the corresponding change in the steering angle, and the currents equal to or below the allowable current are supplied at the preset percentages to the peripheral LEDs on the left side in the horizontal direction and the peripheral LEDs on the right side in the horizontal direction based on the center LED that has changed in the position.

The vehicle controller 110 may be an electronic control unit (ECU).

Figure 5:
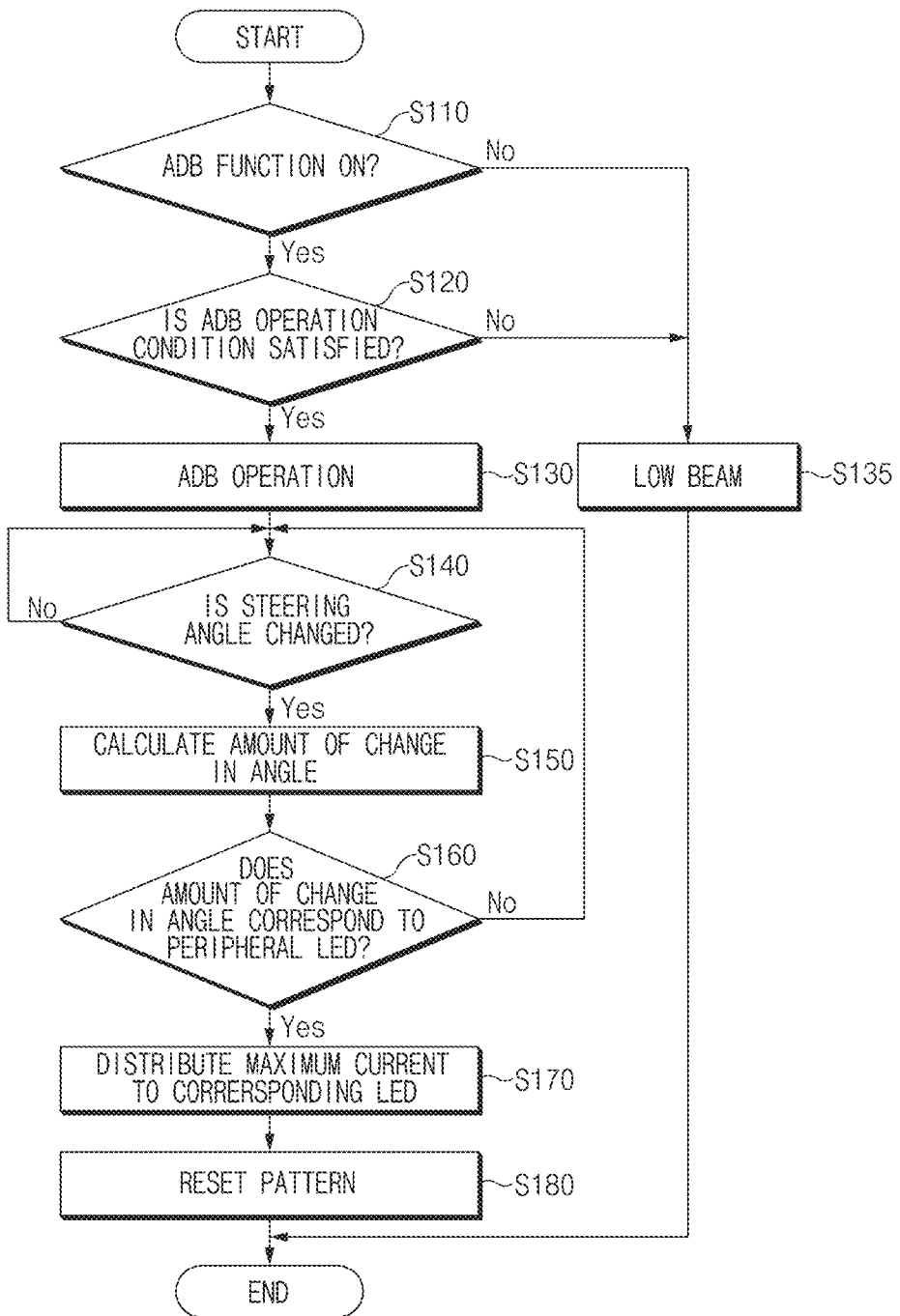
FIG. 5 is a flowchart for illustrating a method for controlling a dynamic bending ADB head lamp system according to an embodiment of the present disclosure.

Hereinafter, a method for controlling a dynamic bending ADB head lamp according to another embodiment of the present disclosure will be described in detail with reference to FIG. 5. FIG. 5 is a flowchart for illustrating a method for controlling a dynamic bending ADB head lamp system according to an embodiment of the present disclosure.

Hereinafter, it is assumed that the dynamic bending ADB head lamp system in FIG. 1 performs a process in FIG. 5.

First, in the LED array 160 that forms the beam pattern by arranging the plurality of LEDs in the matrix form, each angle information is matched to each of the central LED 180, the peripheral LEDs 181 to 187 on the left side in the horizontal direction, and the peripheral LEDs 191 to 197 on the right side in the horizontal direction of the central LED 180 and the matched angle information is stored in the angle matching storage 140.

Accordingly, 0 degrees is matched to the central LED 180 and stored, and the angles of the absolute values increasing in the directions from the central LED 180 to the outermost LEDs on the left side and the right side are matched and stored.

The LED driver 150 provides the ADB function by individually controlling the plurality of LEDs constituting the LED array 160 (S110).

Therefore, when the vehicle senses the opposite vehicle or the preceding vehicle through the camera sensor 120 while traveling straight in the high beam state (S120), as the plurality of LEDs are selectively turned on or off, the dark zone is formed in the space where the opposite vehicle or the preceding vehicle is located to prevent the induction of the glare to the driver of the opposite vehicle or the preceding vehicle (S130).

The change in the steering angle occurs as the steering wheel is rotated for the vehicle to turn left or right (S140), and the vehicle controller 110 calculates the amount of the change in the angle (S150). When the range of the change in the steering angle reaches the angle range matched to the LED (S160), the vehicle controller 110 controls the LED driver 150 to supply the current corresponding to 50% or more of the allowable current to the center LED that has been changed in the position by being matched to the change in the steering angle (S170).

Subsequently, the currents equal to or less than the allowable current are supplied at the preset percentages to the peripheral LEDs on the left side and the peripheral LEDs on the right side of the center LED that has been changed in the position to reset the current pattern supplied to the plurality of LEDs constituting the LED array 160 (S180).

Thus, the central region of the vehicle head lamp moves in response to the change in the steering angle, so that, not only in the low beam state, but also in the high beam state, the central region of the beam pattern moves to the left when the vehicle turns left and the central region of the beam pattern moves to the right when the vehicle turns right, thereby improving the visibility of the driver.

According to the dynamic bending ADB head lamp system and the method for controlling the same as described above, in the ADB or the high beam operation of the vehicle equipped with the head lamp of the matrix type having the ADB function, the central region of the high beam may be moved in a direction of the movement of the vehicle in response to the change in the steering angle of the vehicle to improve the visibility of the driver, and the central region of the high beam may be moved by changing only the current value without the separate driving motor to reduce the manufacturing cost.

In one example, the method for controlling the dynamic bending ADB head lamp system based on operations S110 to S180 according to the present disclosure may be programmed and stored in a recording medium to be read by a computer.

The description above is merely illustrative of the technical idea of the present disclosure, and various modifications and changes may be made by those skilled in the art without departing from the essential characteristics of the present disclosure.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The present technology may improve the visibility of the driver by moving the central region of the high beam in the direction of the movement of the vehicle in response to the change in the steering angle of the vehicle and reduce the manufacturing cost by moving the central region of the high beam by changing only the current value without the separate driving motor in the ADB or the high beam operation of the vehicle equipped with the head lamp of the matrix type having the ADB function.

In addition, various effects that are directly or indirectly recognized through the present document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A dynamic bending ADB head lamp system comprising:
   a steering angle sensor configured to sense a steering angle of a steering wheel;
   an LED array configured to arrange a plurality of LEDs in a matrix form to form a beam pattern, wherein the LED array is formed by matching each angle information to each of a center LED, peripheral LEDs on one side of the center LED, and peripheral LEDs on an other side of the center LED, wherein the one side includes one of a left side and a right side in a horizontal direction based on the center LED, wherein the other side includes the other of the left side and the right side in the horizontal direction; and
   a vehicle controller configured to control an LED driver to supply currents at preset percentages to the plurality of LEDs constituting the LED array, wherein the vehicle controller is configured to control the LED driver to:
      supply currents corresponding to 50 to 90% of an allowable current to a center LED whose position is changed in response to a change in the steering angle when the change in the steering angle is sensed through the steering angle sensor;
      determine the center LED whose position is changed based on the change in the steering angle and center angles of the plurality of LEDs;
      maintain the position of the center LED before the position change until the change in the steering angle reaches a center angle of a peripheral LED on the one side of the center LED before the position change or a peripheral LED on the other side of the center LED before the position change;
      supply currents corresponding to preset percentages equal to or less than the current supplied to the center LED to the peripheral LEDs on one side of the center LED and the peripheral LEDs on the other side of the center LED to reset the current supply pattern supplied to the plurality of LEDs; and
      supply the currents corresponding to the preset percentages to the peripheral LEDs on the one side of the center LED and the peripheral LEDs on the other side of the center LED such that the currents sequentially decrease in directions from innermost LEDs to outermost LEDs in a range equal to or below the current supplied to the center LED.

2. The dynamic bending ADB head lamp system of claim 1, wherein the LED array is configured to:
   match 0 degrees to a center angle of the center LED, wherein the center angle of the center LED is a center of orientation angles of the center LED before a position change; and
   match angles of absolute values increasing in directions from the center LED to outermost LEDs to center angles of the peripheral LEDs on the one side of the center LED before the position change and the peripheral LEDs on the other side of the center LED before the position change, respectively.

3. The dynamic bending ADB head lamp system of claim 2, wherein orientation angles of the respective plurality of LEDs and center angles of the respective orientation angles include fixed values that do not change.

4. The dynamic bending ADB head lamp system of claim 2, wherein orientation angles of the respective plurality of LEDs and center angles of the respective orientation angles include preset fixed values based on a case where a change in the steering angle is 0.

5. A method for controlling a dynamic bending ADB head lamp, the method comprising:
   a setting operation of matching, by an LED array configured to arrange a plurality of LEDs in a matrix form to form a beam pattern, each angle information to each of a center LED, peripheral LEDs on one side of the center LED, and peripheral LEDs on an other side of the center LED and storing the matched angle information, wherein the one side includes one of a left side and a right side in a horizontal direction based on the center LED, wherein the other side includes the other of the left side and the right side in the horizontal direction;
   a sensing operation of sensing, by a steering angle sensor, a change in a steering angle of a steering wheel; and
   a supplying operation of controlling, by a vehicle controller configured to control an LED driver to supply currents to the plurality of LEDs at preset percentages, the LED driver to:
      supply a current corresponding to 50 to 90% of an allowable current to a center LED whose position is changed in response to the change in the steering angle; and
      match 0 degrees to a center angle of the center LED, wherein the center angle of the center LED is a center of orientation angles of the center LED before a position change and storing the matched 0 degrees;
      match angles of absolute values increasing in directions from the center LED to outermost LEDs to center angles of the peripheral LEDs on the one side of the center LED before the position change and the peripheral LEDs on the other side of the center LED before the position change, respectively and storing the matched angles;
      determine the center LED whose position is changed based on the change in the steering angle and center angles of the plurality of LEDs;
      maintain the position of the center LED before the position change until the change in the steering angle reaches a center angle of a peripheral LED on the one side of the center LED before the position change or a peripheral LED on the other side of the center LED before the position change;
      supply currents corresponding to preset percentages equal to or less than the current supplied to the center LED to peripheral LEDs on one side of the center LED whose position is changed and peripheral LEDs on the other side of the center LED whose position is changed to reset the current supply pattern supplied to the plurality of LEDs; and
      after the setting operation and before the sensing operation, supply the currents corresponding to the preset percentages to the peripheral LEDs on the one side of the center LED and the peripheral LEDs on the other side of the center LED such that the currents sequentially decrease in directions from innermost LEDs to outermost LEDs in a range equal to or below the current supplied to the center LED.

* * * * *